United States Patent [19]
Patil et al.

[11] Patent Number: 5,125,231
[45] Date of Patent: Jun. 30, 1992

[54] DUAL CONVERTER ENGINE EXHAUST SYSTEM FOR REDUCING HYDROCARBON EMISSIONS

[75] Inventors: Mallanagouda D. Patil, Corning; Louis S. Socha, Jr., Painted Post; Irwin M. Lachman, Corning, all of N.Y.

[73] Assignee: Corning Incorporated, Corning, N.Y.

[21] Appl. No.: 535,325

[22] Filed: Jun. 8, 1990

[51] Int. Cl.[5] ............................................. F01N 3/28
[52] U.S. Cl. ...................................... 60/274; 60/279; 60/288; 60/297; 422/171
[58] Field of Search ................. 60/279, 274, 297, 288; 422/170, 171

[56] References Cited

U.S. PATENT DOCUMENTS

| | | | |
|---|---|---|---|
| 3,476,508 | 11/1969 | Kearby et al. | |
| 3,674,441 | 7/1972 | Cole | 60/297 |
| 3,699,683 | 10/1972 | Tourtellotte et al. | 60/297 |
| 3,702,886 | 11/1972 | Argauer et al. | 423/328 |
| 3,709,979 | 1/1973 | Chu | 423/328 |
| 3,757,521 | 9/1973 | Tourtellotte | 422/171 |
| 3,832,449 | 8/1974 | Rosinski et al. | 423/328 |
| 3,896,616 | 7/1975 | Keith et al. | 60/274 |
| 3,963,827 | 6/1976 | Acres et al. | 423/239 |
| 4,061,724 | 12/1977 | Grose et al. | 423/335 |
| 4,257,885 | 3/1981 | Grose et al. | 210/691 |
| 4,297,328 | 10/1981 | Ritscher et al. | 423/213.2 |
| 4,631,267 | 12/1986 | Lachman et al. | 502/439 |
| 4,637,995 | 1/1987 | DeAngelis et al. | 502/439 |
| 4,657,880 | 4/1987 | Lachman et al. | 502/64 |
| 4,683,214 | 7/1987 | Angevine et al. | 502/66 |
| 4,800,187 | 1/1989 | Lachman et al. | 502/64 |
| 4,985,210 | 1/1991 | Minami | 422/171 |

FOREIGN PATENT DOCUMENTS

| | | |
|---|---|---|
| 1205980 | 6/1986 | Canada . |
| 0002791 | 7/1979 | European Pat. Off. . |
| 0003818 | 9/1979 | European Pat. Off. . |
| 2214772 | 9/1973 | Fed. Rep. of Germany . |
| 2189309 | 8/1987 | Japan . |
| 68713 | 3/1988 | Japan . |
| 257710 | 10/1989 | Japan . |
| 2-75327 | 3/1990 | Japan . |
| 2-126937 | 5/1990 | Japan . |
| 2-135126 | 5/1990 | Japan . |
| 1334243 | 10/1973 | United Kingdom . |
| 1405406 | 9/1975 | United Kingdom . |
| 2017520A | 10/1979 | United Kingdom . |

Primary Examiner—Douglas Hart
Attorney, Agent, or Firm—Gary H. Levin; Richard N. Wardell

[57] ABSTRACT

An engine exhaust system and method of controlling hydrocarbon emissions are provided. The system and method are based on the use of two catalytic converter chambers, a first chamber containing a catalytic material and a second chamber containing catalyst as well as molecular sieves capable of adsorbing hydrocarbons during engine start-up and of having hydrocarbons desorbed therefrom when the catalysts reach an effective converting temperature. According to the invention, engine exhaust is selectively conveyed to each of the two converters in a manner such that initially produced hydrocarbon is withheld in the system by the molecular sieves in order to be recycled through the converters and brought into contact with the catalyst after an effective converting temperature has been attained.

26 Claims, 3 Drawing Sheets

DUAL CONVERTER ENGINE EXHAUST SYSTEM FOR REDUCING HYDROCARBON EMISSIONS

BACKGROUND OF THE INVENTION

This invention relates to an engine exhaust system designed to reduce hydrocarbon emissions therefrom. More specifically, this invention is concerned with overcoming pollution problems associated with engine start-up, when, because traditional catalytic converter systems have not yet reached an efficient operating temperature, hydrocarbon gases are discharged by the engine exhaust system in great amounts.

The exhaust gases emitted by internal combustion systems utilizing hydrocarbon fuels, such as hydrocarbon gases, gasoline, or diesel fuel, can cause serious pollution of the atmosphere. Among the pollutants in these exhaust gases are hydrocarbons and oxygen-containing compounds, the latter including nitrogen oxides ($NO_x$) and carbon monoxide (CO). The automotive industry has for many years attempted to reduce the quantities of gaseous emissions from automobile engine systems, the first automobiles equipped with catalytic converters having been introduced in model year 1975. The catalytic converters generally utilize noble metal catalysts capable of converting hydrocarbons, CO, and $NO_x$ to non-toxic products water, carbon dioxide, and reduced nitrogen species.

The catalysts utilized in catalytic converter systems are generally inefficient or inactive at ambient temperature and must reach high temperatures, often in the range of 300–400° C., before they are activated. Typically, the temperature of the catalyst is elevated by contacting it with the high-temperature exhaust gases from the engine. Continuous contact with those gases and the exothermic nature of the oxidation reactions occurring at the catalyst combine to maintain the catalyst at an elevated temperature. The temperature at which a catalytic converter can convert 50% of carbon monoxide, hydrocarbons, or $NO_x$ is referred to as the "light-off" temperature of the converter.

During start-up of current commercial engines, the amounts of carbon monoxide and hydrocarbons in the exhaust gas are higher than during normal engine operation. For example, as noted in U.S. Pat. No. 3,896,616, the amount of carbon monoxide at start-up may be on the order of about 3 to 10 or more percent by volume (versus about 0.5 to 3% CO during normal operation), and the amount of hydrocarbons can typically be about 750 to 2,000 parts per million (ppm) (versus about 100 to 750 ppm during normal operation). Applicants' experiments have detected hydrocarbon emissions that are significantly higher even than these reported levels, particularly those generated during start-up. Thus, a large portion of the total emission generated by an internal combustion engine is generated in the first few minutes of operation. Unfortunately, at start-up, when the catalytic converter is most needed, it may be relatively ineffective because it will not have reached a temperature at which it is activated.

There have been numerous suggestions for avoiding the pollution problems inherent in engine start-up, as noted by U.S. Pat. No. 3,896,616. For example, it has been suggested to electrically heat the catalytic converter before starting the engine, but this would unduly increase costs and also cause inconvenient delays before the engine could be started cleanly. It has also been recommended that the catalytic converters be placed as close to the engine as physically possible to minimize the emission of pollutants during the initial engine start-up. The closer the catalyst is to the engine, the hotter will be the exhaust gas when it contacts the catalyst and the more quickly the temperature of the catalyst will be raised to operating level. However, because of limitations of space in most vehicles, locating the total amount of catalyst in the system near the engine is difficult.

U.S. Pat. No. 3,896,616 suggests that excellent purification of engine exhaust gas is obtained by utilizing an initial catalyst, preferably in a converter vessel placed near the engine, for instance, closely adjacent the exhaust manifold, and a down-stream in-line catalyst. The initial catalyst, being close to the engine, will supposedly reach its effective operating temperature significantly sooner than the in-line catalyst. On cold engine start-up, however, during the period before the initial catalyst reaches its effective temperature, substantial quantities of pollutants would still be introduced to the atmosphere. In addition, because the initial catalyst is positioned close to the engine, it can be overheated, causing degradation and loss of effectiveness.

Accordingly, there remains a need for an engine exhaust system that can reduce the amounts of pollutants introduced into the atmosphere during the critical engine start-up period.

SUMMARY OF THE INVENTION

The present invention provides an engine exhaust system having two catalytic converters: a first converter positioned near the engine exhaust manifold, similar to the noble metal catalytic converters traditionally used in automotive exhaust systems, and a second converter, positioned farther from the engine exhaust manifold than the first converter, containing not only catalytic materials but also molecular sieve materials capable of adsorbing and holding hydrocarbons to prevent their discharge into the atmosphere until the catalyst in the converters attains an efficient operating temperature for conversion of the hydrocarbons to less noxious materials. The exhaust system of the invention is intended to eliminate or substantially reduce the hydrocarbons that existing engine exhaust systems now emit during the critical period of engine start-up. The engine exhaust system of the invention, designed to substantially convert hydrocarbons in a hydrocarbon-containing engine exhaust stream to water and carbon dioxide, comprises (1) first catalytic converter means for substantially converting hydrocarbons in a hydrocarbon-containing engine exhaust stream to water and carbon dioxide, said first catalytic converter means having a light-off temperature;

(2) second catalytic converter means, situated farther from the engine than said first means, comprising (a) molecular sieve means capable of adsorbing hydrocarbons from said engine exhaust stream and further capable of having said hydrocarbons desorbed therefrom upon heating to a desorption temperature, and (b) at least one catalyst, preferably a noble metal, for catalyzing the conversion of hydrocarbons to water and carbon dioxide, said catalyst having a light-off temperature; and (3) one or more conveying means for selectively conveying said engine exhaust stream within said engine exhaust system, whereby said conveying means operate to (i) convey, during a first period of time prior to said first catalytic converter means attaining its light-off temperature, substantially all of said engine exhaust stream through said first catalytic converter means and then through said second catalytic converter means;

(ii) convey, during a second period of time subsequent to said first catalytic converter means having attained its light-off temperature and prior to the molecular sieve means having attained its desorption temperature, at least a portion of the exhaust stream discharged from said first catalytic converter means through said second catalytic converter means; and (iii) convey, during a third period of time subsequent to said molecular sieve means having attained its desorption temperature, (a) a portion of the exhaust stream from said first catalytic converter means through said second catalytic converter means and then convey substantially all of the exhaust discharged from said second means back to either said engine or said first means, and (b) the remainder of the exhaust stream from said first means to the atmosphere, bypassing said second means.

In addition to the above-described engine exhaust system, the invention also provides a method of controlling hydrocarbon emissions from an internal combustion engine, such as that used in an automobile, that produces a hydrocarbon-containing exhaust stream. The method comprises the steps of:

providing first catalytic converter means for substantially converting hydrocarbons in said hydrocarbon-containing engine exhaust stream to water and carbon dioxide, said first catalytic converter means having a light-off temperature;

providing second catalytic converter means farther from the engine than said first means, said second means comprising (a) molecular sieve means capable of adsorbing hydrocarbons from said engine exhaust stream and further capable of having said hydrocarbons desorbed therefrom upon heating to a desorption temperature, and (b) at least one catalyst, preferably a noble metal, for catalyzing the conversion of hydrocarbons to water and carbon dioxide, said catalyst having a light-off temperature; and selectively conveying said exhaust stream so as to (i) convey, during a first period of time prior to said first catalytic converter means attaining its light-off temperature, substantially all of said engine exhaust stream through said first catalytic converter means and then through said second catalytic converter means;

(ii) convey, during a second period of time subsequent to said first catalytic converter means having attained its light-off temperature and prior to the molecular sieve means having attained its desorption temperature, at least a portion of the exhaust stream discharged from said first catalytic converter means through said second catalytic converter means; and (iii) convey, during a third period of time subsequent to said molecular sieve means having attained its desorption temperature, (a) a portion of the exhaust stream from said first catalytic converter means through said second catalytic converter means and then convey substantially all of the exhaust discharged from said second means back to either the engine or said first means, and (b) the remainder of the exhaust stream from said first means to the atmosphere, bypassing said second means.

BRIEF DESCRIPTION OF THE DRAWINGS

FIG. 3b is a graph of the hydrocarbon content of the engine exhaust stream entering and existing the zeolite-containing means as a function of time after engine start-up according to the test depicted by FIG. 3a.

DETAILED DESCRIPTION OF THE INVENTION

The novel engine exhaust system of this invention and the method of controlling hydrocarbon emissions performed by the exhaust system are based on the use of two catalytic converter chambers, a first chamber containing catalytic material and a second chamber containing both catalytic material and molecular sieves capable of adsorbing and desorbing hydrocarbons. More particularly, the first converter of the invention is located near the exhaust manifold of the engine itself and contains catalysts of the kind conventionally used to convert hydrocarbons in the exhaust of an internal combustion engine (such as an automotive engine) to carbon dioxide and water. Preferably the catalyst is a noble metal catalyst. The second converter is located down-stream in the exhaust system from the first converter and is a catalyzed molecular sieve system that contains not only hydrocarbon-converting catalyst but also molecular sieves capable of adsorbing unconverted hydrocarbons while at lower temperatures associated with cold-engine start-up and further capable of having such hydrocarbons desorbed at higher temperatures. In operation, the exhaust system of the invention selectively conveys the engine exhaust to each of the two converters in a manner such that initially produced hydrocarbon, which might otherwise pass through the system unconverted because the catalyst has not had sufficient time to reach an efficient conversion temperature, are withheld in the system by the molecular sieves in order to be recycled through the converters and brought into contact with the catalyst after an effective operating temperature has been attained.

Figure 1:
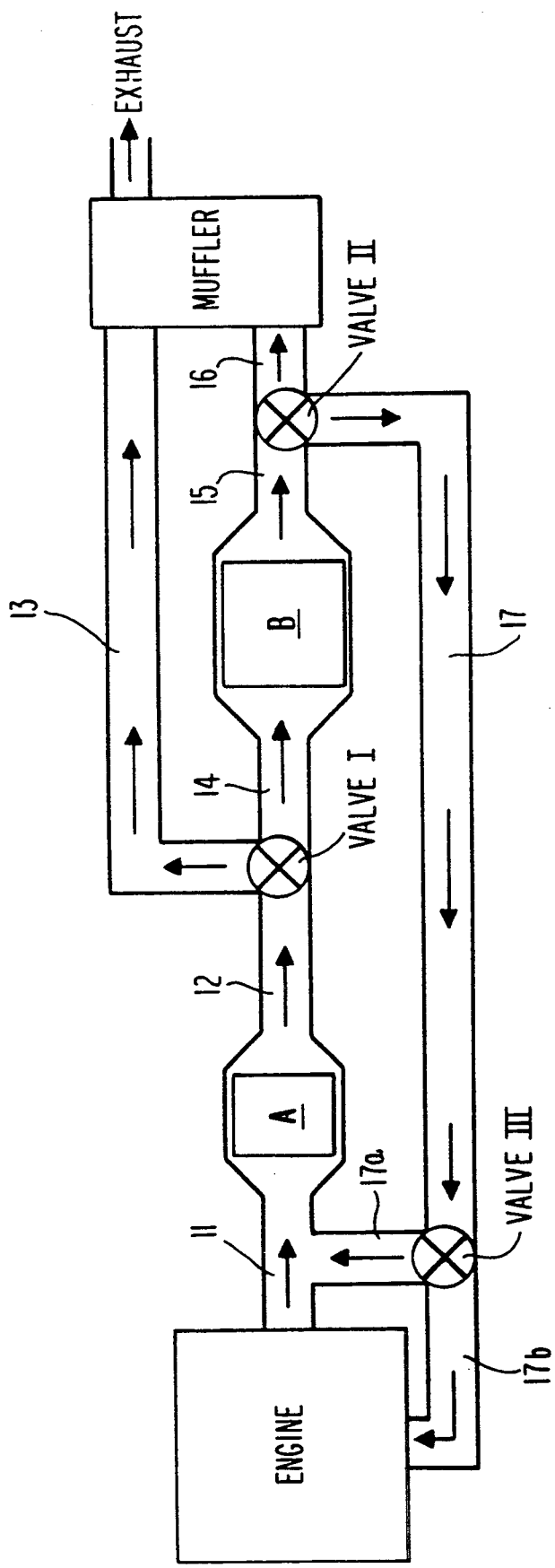
FIG. 1 is a schematic drawing of an engine exhaust system according to the invention.

The first catalytic converter used in the invention, designated generally as converter A in FIG. 1, is of the kind generally used in automotive emission-control systems. As such, it is capable at least of converting hydrocarbons to water and carbon dioxide. For example, noble metal catalysts, such as mixtures of platinum and palladium, are capable not only of oxidizing hydrocarbons but also of converting carbon monoxide in the engine exhaust stream to carbon dioxide. In many case, three-way converters that additionally convert $NO_x$ are used. Typically, a three-way converter comprises noble metal catalysts such as platinum and/or palladium, and rhodium. In the traditional manufacture of such catalytic converter systems, a substrate, generally of ceramic material, is provided with a coating of a high surface area material, generally a porous oxide media, upon which the catalytic material is actually deposited.

In the formation of such systems, a sintered and hardened ceramic substrate, which can be in the shape of a honeycomb, wagon-wheel, or other molded or shaped objects, or simply be in the form of pellets, is coated with a slurry of the high surface area material, after which the catalyst, such as noble metal, is applied to the slurry-coated substrate, generally by application of a solution of a salt of that metal.

More particularly, the underlying ceramic substrate is composed of a well known material such as cordierite, mullite, alumina, lithium aluminosilicates, titania, zircon, feldspar, quartz, fused silica, clays, kaolin clay, aluminum titanate solid solutions, silicates, zirconia, spinels, glasses, glass ceramics, aluminates, and mixtures thereof. The constituent ceramic materials are generally admixed with binders or shaping agents, processed, molded where applicable, and sintered, all by methods well known in the art. Coating of the substrate with the high surface area media can be effected either by immersion or dipping, followed by heat-treating the coated substrate in a temperature range of 500–600° C. Generally the weight of the slurry coating, prior to heat treatment, is about 15–30% of the weight of the substrate itself. Procedures for depositing a high surface area "wash-coat" on the previously sintered ceramic substrate are disclosed, for example, in U.S. Pat. No. 3,824,196. Following application of the slurry of high surface area material, the catalyst is applied in the manner stated above. Alternatively, a single "wash-coat" mixture of the high surface area media and the catalytic material can be applied together.

Other methods of preparing the first catalytic converter means of this invention are also known. Methods of incorporating a high surface area phase, upon which to deposit catalyst, into or onto an extruded ceramic substrate are disclosed, for example, in U.S. Pat. No. 4,631,267; 4,657,880; and 4,637,995; which patents are hereby incorporated by reference. Those patents disclose methods for incorporating high surface-area material (such as aluminas, silica, spinels, titanias, zirconias, or mixtures thereof) as a high surface area phase within a sinterable ceramic support material that provides strength and integrity to the extruded shape. Catalytically active metal material is deposited on the incorporated high surface-area material by methods known in the art.

The second catalytic converter means of the engine system of this invention is a catalyzed molecular sieve system that comprises molecular sieves, a catalyst (preferably a noble metal such as platinum and/or palladium), and optionally a ceramic binder and at least one porous oxide of high surface area, all of which are affixed to, or integrated into and/or onto, a suitable substrate. Such a system is described in U.S. patent application Ser. No. 07/273,214, filed Nov. 18, 1988, entitled "Molecular Sieve-Palladium-Platinum Catalyst on a Substrate," which application is incorporated by reference herein as filed.

The total noble metal loading is in the range 5–50 gm/ft$^3$ and preferrably 15–40 gm/ft$^3$. The ratio of Pt/Rh or Pd/Rh or (Pt+Pd)/Rh is in the range 5/1 to 50/1, preferably 10/1 to 20/1.

The molecular sieves that are useful in this second converter means are those that are capable of adsorbing and desorbing hydrocarbons selectively. The molecular sieves have channels and pores sized at the atomic level, making them capable of adsorbing the hydrocarbon molecules. The particular molecular sieves best suited for use in this invention are those that adsorb hydrocarbons preferentially to water. The preferred molecular sieves are high-silica crystalline zeolites, hydrated aluminosilicates whose structures are based on a theoretically limitless three-dimensional network of $AlO_x$ and $SiO_y$ tetrahedra linked by the sharing of oxygen atoms. Suitable materials are described, for example, in U.S. Pat. No. 4,297,328, (the disclosure of which is herein incorporated by reference), as those zeolites having a $SiO_2/Al_2O_3$ molar ratio which exceeds about 10 and preferably is in the range of about 70–200. Representative of the high-silica zeolites are "silicalite", ZSM-5, ZSM-8, ZSM-11, ZSM-12, Hyper Y, ultrastabilized Y, Beta, mordenite and erionite. In addition, the high-silica zeolites prepared as described in the illustrative examples of U.S. Pat. No. 4,297,328, are also suitable.

"Silicalite" is a novel crystalline silica composition having a hydrophobic/organophilic characteristic which permits its use for selectively adsorbing organic materials preferentially to water. Silicalite is more completely described in U.S. Pat. No. 4,061,724, the disclosure of which is herein incorporated by reference. ZSM-5, ZSM-8, ZSM-11 and ZSM-12 are crystalline zeolites and are disclosed in U.S. Pat. No. 3,702,886, in British Specification No. 1,334,243, published Oct. 17, 1973, in U.S. Pat. No. 3,709,979, and in U.S. Pat. No. 3,832,449, respectively. The disclosures of each of these patents and publications are herein incorporated by reference.

Ultrastabilized Y is a form of zeolite Y which has been treated to give it the organophilic characteristic of the above-mentioned adsorbents. A description of ultrastabilized Y may be found in "Crystal Structures of Ultrastable Faujasites", Advances in Chemistry Sciences, No. 101, American Chemical Society, Washington, D.C., pages 266–278 (1971).

Novel high-silica zeolite compositions suitable for use in this invention are also described in U.S. Pat. No. 4,257,885, herein incorporated by reference. These zeolites have a chemical composition expressed in terms of moles of oxides as follows:

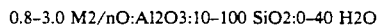

0.8–3.0 M2/nO:Al2O3:10–100 SiO2:0–40 H2O where M represents a metallic cation and n is the valence of M.

Other zeolites having the properties described herein can also be used without departing from the scope of this invention.

In the formation of the catalyzed molecular sieve system, the molecular sieve (hereinafter referred to, in a non-limiting manner, as zeolites) is preferably admixed with a permanent ceramic binder and water into the form of a slurry. The permanent binders are various high surface area aluminas, silica, zirconia, spinel, or titania. The preferred binders are the aluminas. The alumina is generally gamma alumina or some other high surface area alumina or precursor thereof. Examples are transition aluminas, such as pseudoboehmite, hydrated aluminas, hydrolyzed aluminum alkoxide, such as isopropoxide, and aluminum chlorhydrate.

The zeolite-containing slurry is then coated over a suitable substrate. The substrate to which the slurry is applied can take the shape of a honeycomb, wagon-wheel, or other molded or shaped object of various geometries, or the substrate can be in the form of simple pellets. The materials of the substrates are well known ceramic materials such as cordierite, mullite, alumina, lithium aluminosilicates, titania, zircon, feldspar, quartz, fused silica, clays, kaolin clay, aluminum titanate, aluminum titanates solid solutions, silicates, zirconia, spinels, glasses, glass ceramics, aluminates, and mixtures thereof. To make the substrate, the constituent ceramic materials are generally admixed with binders or shaping agents, processed, molded where applicable, and sintered, all by methods well known in the art.

Coating of the substrate can be effected either by immersion or dipping, followed by heat-treating the coated substrate in a temperature range of 500-600° C. Generally, the weight of the slurry coating, prior to heat treatment, is about 15-30% of the weight of the substrate itself.

Following application of the slurry, the noble metal catalyst is incorporated into the structure, generally by application of a solution of a salt of the metal to the slurry-coated substrate. It has been found that the noble metal salts are preferentially deposited on the high surface area binder rather than on the zeolites themselves, advantageously providing thereby a segregated system in which the zeolites and noble metals are positionally juxtaposed to each other. Accordingly, the zeolites are available, in the finished system, to adsorb hydrocarbons until the catalytic metal reaches its efficient converting temperature, and the metals themselves are then available to catalytically convert the hydrocarbons during further operation of the exhaust system.

It should be appreciated that various other methods can also be used to form the catalyzed molecular sieve or zeolite system of the second converter means. For example, the catalytic material can first be dispersed on a high surface area material, such as gamma alumina or a precursor therefor, followed by heat-treating the material and then mixing it with the zeolite-containing slurry, after which this resultant mixture is applied to the substrate. Another variation is to first incorporate the catalytic material and a high surface area carrier for the catalyst onto or into the substrate, and thereafter apply the zeolite-containing slurry. Additional methods of incorporating zeolites, as a high surface area phase, and noble metal into or onto an extruded monolithic ceramic substrate are disclosed, for example, in U.S. Pat. No. 4,631,267; 4,657,880; and 4,637,995; all of which are hereby incorporated by reference.

Another method of providing zeolites to a substrate is by crystallizing the zeolites in-situ on the surfaces of, for example, a monolithic ceramic substrate. Such a method is disclosed in U.S. Pat. No. 4,800,187, herein incorporated by reference. According to this method, the ceramic substrate, such as a honeycomb, is treated, in the presence of active silica, with a caustic bath to crystallize the silica to a zeolite form. In one embodiment of the disclosed invention, a monolithic ceramic substrate having an oxide composition consisting essentially of 45-75% by weight silica, 8-45% by weight alumina, and 7-20% by weight magnesia is hydrothermally treated with an aqueous solution comprising sodium oxide or hydroxide, alumina and optionally active silica at a temperature and for a time sufficient to crystallize a desired zeolite on the surfaces of the substrate. In a second embodiment, a monolithic ceramic substrate is coated with a layer of active silica, the coating being 1-45% of the weight of the coated substrate, and then hydrothermally treated with an aqueous solution comprising sodium oxide or hydroxide and alumina to crystallize the active silica to the desired zeolite and provide the zeolite on the surfaces of the substrate. In a third embodiment, a sintered monolithic body, which comprises a porous ceramic material and 1-40% by weight, based on the total body weight, of active silica embedded within the ceramic material, is hydrothermally treated with an aqueous solution comprising sodium oxide or hydroxide and optionally alumina to crystallize a desired zeolite on the surface of the body. After such in-situ crystallization of the zeolites, the catalytic material can be applied to the zeolite-containing substrate by methods previously described.

In another method of incorporating zeolites and catalytic material with a ceramic substrate, two distinct wash-coat layers can be applied to the ceramic substrate. It is known to those skilled in the art that traditional wash-coat materials are high surface area porous oxide media. Separate wash-coat mixtures of zeolites and of noble metals, each on high surface area oxides, can be prepared. The substrate is then sequentially and separately treated with each wash-coat, such that a layered effect is obtained, with no preference for which layer is first applied. Because of the porosity of the oxide material that makes up the wash-coat, both the zeolites and the catalytic material will be accessible to the hydrocarbons in the engine exhaust stream.

In variations of the construction of this second catalytic converter means, the zeolites and noble metals can be incorporated into or onto the substrate such that the front end of the substrate (with respect to the direction of flow of the engine exhaust stream) is coated or otherwise impregnated with one, while the back end is treated with the other. Alternatively, each of two separate substrates can be treated with a separate wash-coat slurry of noble metal or zeolite, and the two treated substrates can be placed in series in the exhaust stream. Either of these embodiments, as well as the previously-described embodiment in which the zeolites and noble metals are associated together with a single substrate, produce a similar result—that is, the zeolites adsorb and hold hydrocarbons for a period of time until the noble metal catalyst reaches an effective temperature, at which point the hydrocarbons are released from the zeolite for catalytic conversion by the noble metal.

Whatever particular form the catalyzed zeolite-containing converter means takes, there should generally be about 1-95% by weight zeolite, and it is preferred that the converter contain sufficient zeolite to adsorb at least about 6 grams of hydrocarbon. Accordingly, for the zeolites useful in the practice of this invention, which generally adsorb about 0.03 grams of hydrocarbon per gram of zeolite, at least about 200 grams of zeolite are preferably incorporated into the catalyst system.

In the following description of the engine exhaust system and method of this invention, the molecular sieves are described mostly in terms of a zeolite. Although the preferred molecular sieve is a zeolite, referenced to zeolite in this description is not intended to limit the scope of the invention to the exclusion of non-zeolitic molecular sieves that function as described above.

In the operation of the system of this invention, the zeolites function to adsorb and "hold" a substantial portion of the hydrocarbon emissions generated during start-up of the engine. Because the catalytically active metals used in the catalytic converters of this exhaust system (as well as in the exhaust systems heretofore used) generally will not have attained an effective operating temperature during the start-up period, these adsorbed hydrocarbons would otherwise be discharged to the atmosphere unconverted.

The zeolites used in this invention are known to adsorb and desorb hydrocarbons at different temperatures. The adsorption capacity of zeolites is a function of their porosity. At ambient temperatures, for example, the zeolites will naturally adsorb several species in addition to hydrocarbons, such as carbon dioxide and the ordinary constituents of air. To the extent the pores are filled with these other species, they are not available to adsorb hydrocarbons. Upon engine start-up, even at cold temperatures, the generated hydrocarbons will begin to be adsorbed to the extent that the zeolite pores are vacant. Further, the mere flow of exhaust stream through the zeolites will dislodge some of the other gaseous species that may have become adsorbed while the engine was idle, allowing hydrocarbons, for which the zeolites show preference, to approaches 70° C. (being heated from contact with the hot exhaust stream), other species start to desorb rapidly and even more substantial adsorption of the hydrocarbons takes place. Desorption of hydrocarbons from the zeolite begins when the zeolite reaches a temperature of about 250° C., and desorption is generally complete by the time the zeolite reaches a temperature of about 350° C.

With respect to the catalytically active metals used in both catalytic converters of this invention, the "light-off" temperature of those materials is the temperature at which there is 50% conversion of hydrocarbons. The catalytic materials generally used in automotive catalytic converters have light-off temperatures in the range of about 300–400° C. Since hydrocarbons begin to desorb from the zeolite at a temperature below light-off temperature of the catalyst, however, it is not possible merely to place zeolite "in-line" in the exhaust system with the catalyst; in such a case, desorption would occur before the catalyst has reached an effective temperature and unconverted hydrocarbons would still be discharged to the atmosphere as a result. An engine exhaust system, such as the system of this invention, therefore, must enable the zeolite to "hold" the adsorbed hydrocarbons until the catalytic material has been sufficiently activated and only then "release" the hydrocarbons to the catalyst for conversion.

As indicated above, it is essential that, as soon after engine start-up is possible, the catalytic material in each of the converters attain its effective temperature, that is, at least light-off temperature. In all cases, the temperatures of the zeolite and of the catalytically active material are raised simply through contact with the hot exhaust gases emitted by the engine.

With general reference to FIG. 1, in the exhaust system of the present invention, the first converter (designated generally as converter A) is positioned closely adjacent the exhaust manifold (not shown) of the engine. As disclosed in U.S. Pat. No. 3,896,616, for example, this converter is preferably situated at a distance from the engine such that it can attain a temperature of at least about 400° F. (about 200° C.) within about 20 seconds of the beginning of sustained engine combustion. The second converter used in this invention (indicated generally as B), which contains both catalyst and the adsorption/desorption zeolite, is situated downstream of the first converter A. Because the exhaust pipes (designated 12 and 14) connecting the two converters are not insulated, exhaust passing therethrough loses heat to the environment and the exhaust gas will be significantly cooled prior to reaching the second converter. Therefore converter A is heated at a significantly greater rate than is converter B. For example, in use with a typical automotive engine, with relative placement of the converters as automotive size permits, converter A would attain a temperature of about 360° C. (light-off temperature) within 70 seconds after engine start-up, while converter B in that time would rise only to about 140° C., a temperature at which it is still capable of adsorbing and retaining hydrocarbons.

This relative placement of the two catalytic converters, with the initial difference in temperature that it causes, is a basic design feature of the engine system of the invention. Because the first converter reaches light-off before the zeolite in the second converter loses its temperature-dependent ability to keep hydrocarbons adsorbed, the system is designed such that hydrocarbons discharged from the engine during start-up, which hydrocarbons would otherwise pass through a typical emission system without conversion, will be adsorbed and held by the zeolites in converter B until converter A reaches its light-off temperature. Thereafter, the previously adsorbed hydrocarbons are released and, as more fully described below, are recycled to converter A, which is now effective to oxidize them to non-toxic by-products. In another embodiment the invention, the previously adsorbed hydrocarbons are recycled to the engine itself for further combustion.

For the purpose of generally defining this invention, the light-off temperature of the catalyst is used as a bench-mark for its efficient operation. However, it must be appreciated that this designation of effectiveness is somewhat arbitrary. Even before the converter attains its light-off temperature, it generally has some capability to convert hydrocarbons, and a system of this invention can be designed so that hydrocarbons are desorbed from the zeolite and recycled to the converter somewhat before it has actually attained light-off. Any such method or design would perform substantially the same function in substantially the same way to achieve substantially the same result as the present system.

With particular reference to FIG. 1, the engine exhaust system of this invention comprises a first catalytic converter, designated generally as A, positioned closely adjacent to the engine. During start-up of the engine, exhaust gases are discharged from the engine, generally through the exhaust manifold (not shown), and then through line 11 to converter A, and thereafter directly through lines 12 and 14 to zeolite-containing converter B. During this initial period of engine start-up, before converter A reaches its light-off temperature, thermostatically-controlled three-way valve I directs the exhaust stream from converter A through line 14 (keeping line 13 closed during this period) directly to zeolite-containing converter B, where hydrocarbons that have passed untreated through converter A are adsorbed and held. Exhaust stream passing through converter B, having had hydrocarbon removed therefrom, is then conveyed through line 15, thermostatically-controlled three-way valve II, and line 16 to the muffler, from which it passes to the atmosphere. (As used herein, "line" or "lines" refers to standard exhaust system piping.) During this period before converter A reaches light-off temperature, valve II keeps recycle line 17 closed so that all exhaust from converter B leaves the system as just described. Passage of the engine exhaust through converters A and B raises their internal temperatures. As discussed above, because of the greater proximity of converter A to the engine, its temperature is raised much more rapidly and it reaches or surpasses its light-off temperature while the zeolites in converter B are still capable of retaining hydrocarbons; that is, before they reach the temperature at which hydrocarbons begin to desorb.

Once converter A has reached its light-off temperature, at least a portion of the exhaust stream discharged from converter A continues to be directed by valve I through line 14 to converter B so that the temperature of the zeolites in converter B will be further raised and the temperature of the catalyst in converter B can continue to be raised toward its light-off temperature. Optionally, valve I can be programmed for this period to divert a portion of the exhaust from converter A through by-pass line 13, through which it is conveyed to the muffler and to atmospheric discharge. This diversion can be made so that the zeolites in converter B are not exposed to the entirety of the exhaust stream and therefore are not heated up as rapidly, thus permitting converter A to reach a highly effective conversion temperature before zeolites in converter B reach their desorption temperature. Although it is possible during this period to divert all of the exhaust from converter A to line 13, at least for some period of time following the attainment of converter A of its light-off temperature, the exhaust stream discharged from that converter, or at least a portion thereof, must be passed through converter B to continue to raise the temperature of the zeolites and catalytic material therein.

Valve II is also generally programmed so that during this period of time (after converter A attains light-off but before the zeolites of converter B reach their desorption temperature) the exhaust from converter B is conveyed through lines 15 and 16 to the muffler for ultimate discharge from the system. Optionally, however, valve II can be set so that during this period a portion of the exhaust stream discharged from converter B is recycled through lines 17 and 17a to converter A, where any untreated, unadsorbed hydrocarbons are again passed through the catalytic material for treatment. It is preferred that any such recycle not begin until late in this period, at a time just before the zeolites reach their desorption temperature and the catalyst in converter A is well into its effective temperature range. For any recycle operation involving line 17a, a venturi, pump, or other such pressure-raising means (not shown in FIG. 1) will generally be required at some position along line 17a to generate sufficient pressure to direct the gases back into line 11, the feed line to the first converter.

The continued passage of engine exhaust through converter B, all as described above, eventually causes the zeolite to attain a temperature at which desorption of the hydrocarbon material commences. According to the operation of this invention, the entirety of the exhaust from converter B, now containing hydrocarbons desorbed from the zeolites, is recycled.

This recycle operation is effected by continuing to direct a portion of the engine exhaust stream through converter B to flush out the hydrocarbons from the zeolite. The stream discharged from converter B passes through line 15 and is directed by valve II through recycle lines 17 and 17a, which convey it to line 11 at the intake of converter A as shown. Valve II is thermostatically set to recycle the entirety of the discharge from converter B (completely closing off line 16) from the time the desorption temperature of the zeolites is reached until the internal temperature of converter B, and therefore the catalyst contained therein, reaches catalyst light-off temperature. In such a manner, the hydrocarbons that had initially been held by the zeolite in converter B are flushed out by the exhaust stream passing through the converter and, rather than being discharged directly to the atmosphere, are recycled to converter A for treatment. During this period after the zeolites reach their desorption temperature and while recycle of the previously-held hydrocarbons proceeds, valve I is set so that a portion of the exhaust from converter A is conveyed through line 13 in order to by-pass converter B. The remaining portion of the stream from converter A is passed to converter B through valve I to flush out the hydrocarbons for recycling.

In an alternative recycle operation, the exhaust and desorbed hydrocarbons from converter B can be recycled directly back to the engine through line 17b for further combustion. In such an operation, three-way valve III directs the recycled stream in line 17 to line 17b (rather than to line 17a, as previously described). Because the engine intake operates at vacuum, no pressure-raising means is required for any recycle operation involving line 17b.

The continued passage of engine exhaust gases through converter B continues to raise its internal temperature. Desorption of the zeolite is generally complete by the time the temperature of converter B reaches about 350° C. The attainment of this temperature causes valve II to close line 17 (thereby ending the recycle operation) and to direct the entire discharge from converter B to line 16 and thereafter to the muffler. Preferably, however, valve II is set to continue recycling until the converter B temperature reaches about 370-400° C. to more fully ensure that no hydrocarbons that had been held by the zeolite are exhausted from the system unconverted. Valve I is generally coordinated with valve II so that, after hydrocarbon desorption is completed, valve I closes line 13 at the same time or shortly after valve II closes recycle line 17, thereby conveying all engine exhaust directly through converter A, thereafter through converter B, and thereafter to the muffler for final exhaustion to the atmosphere. By this time, the catalyst in converter B has at least reached its light-off temperature, so that all engine exhaust passes through two effectively functioning catalytic converters before emission.

Figure 2:
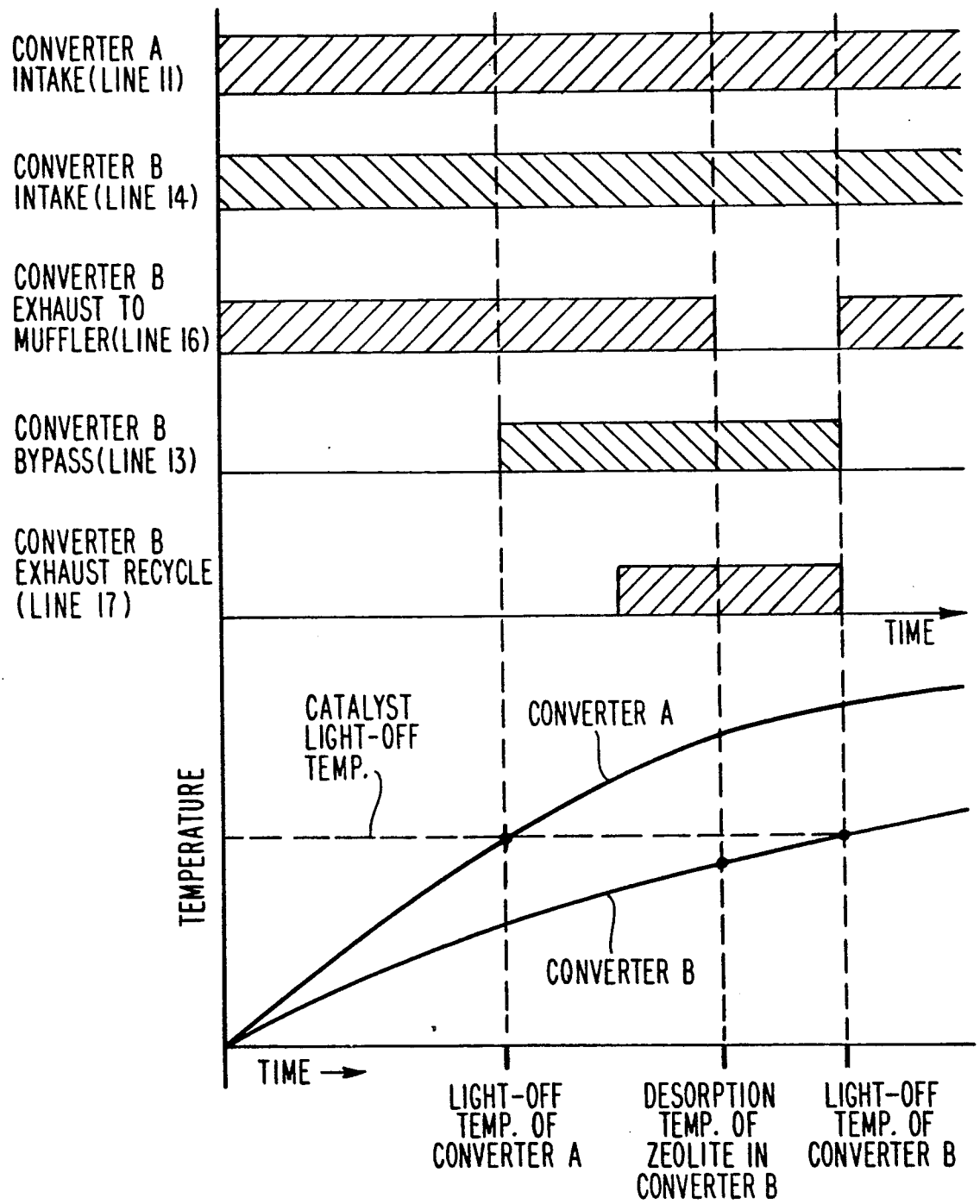
FIG. 2 is a chart illustrating, as a function of time, the relative temperatures attained by the two catalytic converter means in the engine exhaust system of the invention and the conveyance of exhaust gases through the system in a preferred operation of the system.

With reference to FIG. 2, there is shown a chart illustrating a preferred operation of the system and depicting the relative temperatures attained by the converters A and B as well as the conveyance of exhaust gases through the engine exhaust system as a function of time. In the chart, cross-hatching indicates that the designated line is at least partially open during the indicated period. As can be seen, during the initial engine start-up period, before converter A reaches its light-off temperature, the exhaust gases from the engine are passed through converter A, thereafter to and through converter B, where hydrocarbons are adsorbed, and finally to the muffler, through line 16 for emission to the atmosphere. When converter A reaches its light-off temperature, valve I has opened by-pass line 13. Line 14, the intake to converter B, also remains open such that the engine exhaust, after passing through converter A, is divided by valve I so that one portion of that exhaust passes through converter B and thereafter to the muffler, and the remaining portion of the stream by-passes converter B, via line 13, to go directly to the muffler. At some time after converter A reaches light-off but before converter B reaches the desorption temperature of its contained zeolite, valve II is activated to open recycle line 17 so that a portion of the stream passing through converter B begins recycling even before substantial desorption begins to take place. After the desorption temperature is reached, however, line 16, which conveys exhaust from converter B to the muffler, is closed by valve II so that the entirety of the exhaust from converter B is recycled through line 17. During this time, by-pass line 13 remains open so that a portion of the engine exhaust passing through converter A goes to the muffler for emission to the atmosphere and a portion passes through converter B to flush out the previously-adsorbed hydrocarbons. When the internal temperature of converter B reaches the light-off temperature of the catalyst contained therein, by-pass line 13 and recycle line 17 are closed by valves I and II, respectively, and the engine exhaust stream once again passes directly through converter A, thereafter to and through converter B, and then to the muffler for emission from the system.

The adsorption/desorption of the zeolites has been demonstrated in an engine dynamometer test performed by using a pentasil-type zeolite of the kind useful in the practice of the present invention. As representative of the molecular sieve means used in this invention, such a pentasil-type zeolite was crystallized in situ on the surface of a CELCOR cordierite honeycomb by the method described in U.S. Pat. No. 4,800,187, as discussed above. By passing the exhaust stream of a typical automotive engine through this zeolite-containing honeycomb, and measuring the hydrocarbon content of the stream as it enters and exists the zeolite, it was observed that during engine start-up, the exhaust leaving the engine manifold reached a maximum of approximately 45,000 ppm (about 4.5%) hydrocarbons during the first 20 seconds after engine start-up, and by 120 seconds after engine start-up, steady-state hydrocarbon emission of approximately 1,500 ppm (0.15%) was reached. As the temperature of the zeolite increased due to contact with the exhaust gases, hydrocarbons began to be desorbed from the zeolite. This was indicated by a temporary increase in the rate at which hydrocarbon was discharged from the zeolite-containing honeycomb during the period from about 20-120 seconds after start-up.

Figure 3A:
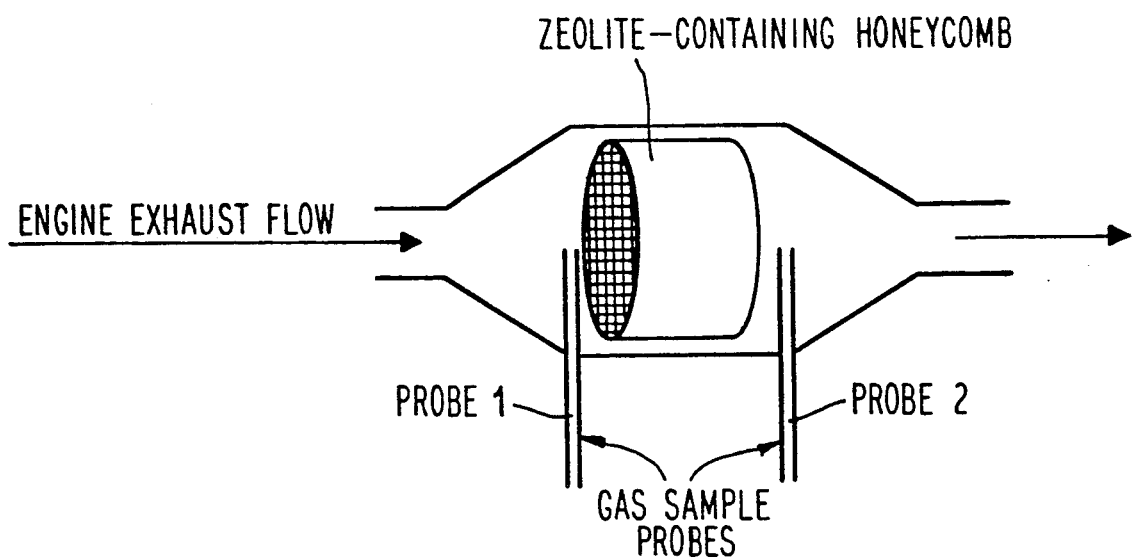
FIG. 3a schematically depicts a test of the zeolite-containing means of the invention.
Figure 3B:
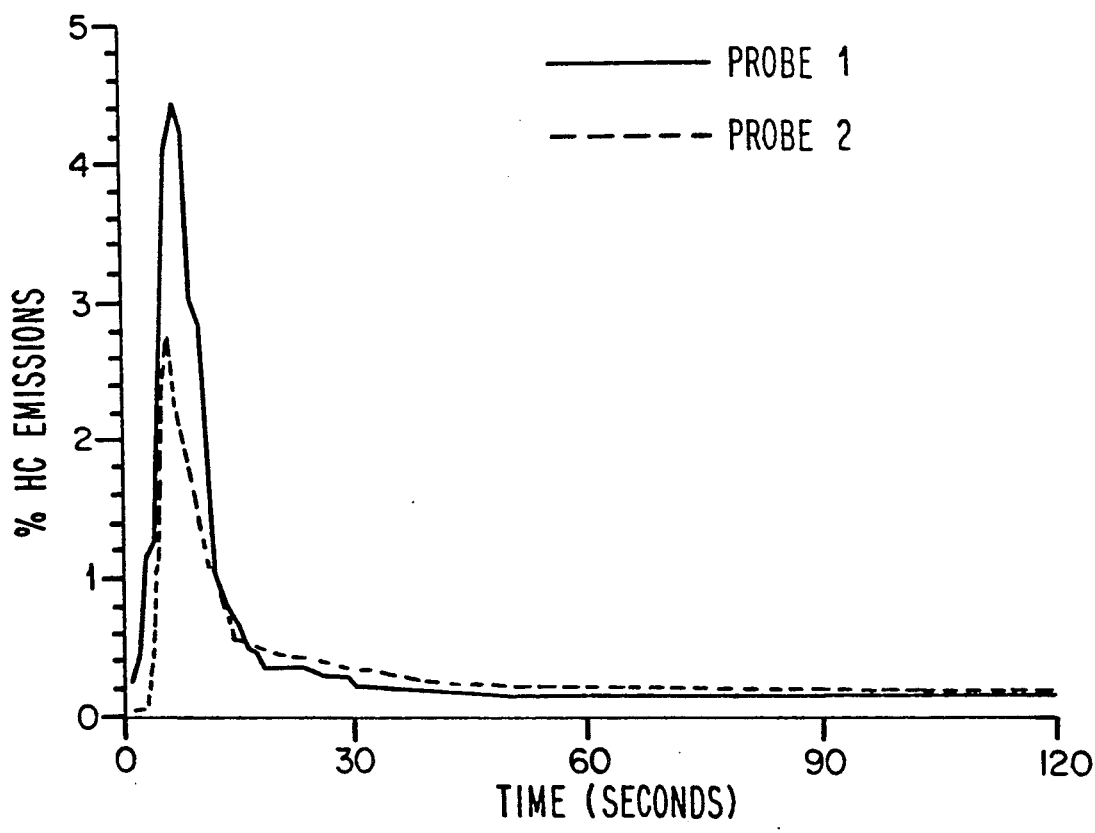

The procedure for and results of this dynamometer test are shown in FIGS. 3a and 3b, respectively. In FIG. 3a, the positioning of the gas probes, through which the hydrocarbon content of the engine exhaust stream was measured, is schematically shown, indicating probe 1 positioned to sample the engine exhaust immediately prior to its contact with the zeolite and probe 2 positioned to sample the exhaust stream as it exits the zeolite-containing honeycomb. FIG. 3b is a plot of the hydrocarbon content of the exhaust stream immediately before it passes through the zeolite-containing honeycomb (as measured by probe 1) and immediately after it exits the honeycomb (as measured by probe 2) as a function of time after engine start-up. As can be seen, during about the first 20 seconds after engine start-up, the hydrocarbon content of the exhaust stream is generally always higher before passing through the zeolites, demonstrating the removal of hydrocarbons from the engine exhaust stream through adsorption by zeolites. After about 20 seconds, however, the temperature of the zeolite is raised to its desorption temperature, and therefore the hydrocarbon content of the stream exiting the zeolite-containing honeycomb is slightly higher than that of the entering stream as the stream removes the previously adsorbed hydrocarbons from the zeolites. By about 120 seconds, the previously adsorbed hydrocarbons are substantially completely desorbed, and therefore the hydrocarbon content of the stream entering and exiting the honeycomb is about the same. The data in FIG. 3b also demonstrates the phenomenon, as earlier mentioned, that hydrocarbon emissions from a typical automotive engine are generally at their highest immediately following engine start-up. In the example shown in FIG. 3b, the peak hydrocarbon emission occurred during the first 20 seconds.

It is also known that some fraction of the adsorbed hydrocarbons generally will be decomposed during the desorption process to carbon itself or will be decomposed and oxidized to carbon monoxide and/or carbon dioxide. Accordingly, the hydrocarbon that is actually detectable as being desorbed from the zeolite is generally 10-15% less than the hydrocarbon that is originally adsorbed. This phenomenon, however, does not affect the operation of the present invention because, as explained, the catalyst generally used in the converter means of the invention will convert any carbon monoxide that is generated while the zeolite is desorbing to carbon dioxide.

What is claimed is:

1. An exhaust system for the conversion of hydrocarbons in an exhaust stream from an engine comprising:

first catalytic converter means for substantially converting hydrocarbons in a hydrocarbon-containing engine exhaust stream to water and carbon dioxide, said first catalytic converter means having a light-off temperature;

second catalytic converter means, situated farther from the engine than said first means, comprising (a) molecular sieve means capable of adsorbing hydrocarbons from said engine exhaust stream and further capable of having said hydrocarbons desorbed therefrom upon heating to a desorption temperature, and (b) at least one catalyst for the conversion of hydrocarbons to water and carbon dioxide, said catalyst having a light-off temperature; and one or more conveying means for selectively conveying said engine exhaust stream within said engine exhaust system, whereby said conveying means operate to (i) convey, during a first period of time prior to said first catalytic converter means attaining its light-off temperature, substantially all of said engine exhaust stream through said first catalytic converter means and then through said second catalytic converter means;

(ii) convey, during a second period of time subsequent to said first catalytic converter means having attained its light-off temperature and prior to the molecular sieve means having attained its desorption temperature, (a) a portion of the exhaust stream discharged from said first catalytic converter means through said second catalytic converter means, and (b) the remainder of the exhaust from said first means to the atmosphere, bypassing said second means; and (iii) convey, during a third period of time subsequent to said molecular sieve means having attained its desorption temperature, (a) a portion of the exhaust stream from said first catalytic converter means through said second catalytic converter means and then recycle substantially all of the exhaust discharged from said second means back to either said engine or to said first means, and (b) the remainder of the exhaust stream from said first means to the atmosphere, bypassing said second means.

2. The engine exhaust system of claim 1 wherein said molecular sieve means comprises a high-silica crystalline zeolite and said catalyst comprises at least one noble metal.

3. The engine exhaust system of claim 2 wherein said zeolite is selected from the group consisting of silicalite, ZSM-5, ZSM-8, ZSM-11, ZSM-12 and mordenite.

4. The engine exhaust system of claim 2 wherein said second catalytic converter means comprises a ceramic substrate coated with or embedded with zeolite and noble metal catalyst.

5. The engine exhaust system of claim- 4 wherein said zeolite is selected from the group consisting of silicalite, ZSM-5, ZSM-8, ZSM-11, ZSM-12, and mordenite.

6. The engine exhaust system of claim 4 wherein said ceramic substrate is in the form of a honeycomb.

7. The engine exhaust system of claim 2 wherein said conveying means comprises at least one thermostatically-controlled valve, and wherein, during said third period of time, said conveying means functions to convey the exhaust from said second converter means back to said first converter means.

8. The engine exhaust system of claim 7 wherein, during said second period of time, said conveying means functions such that a portion of the exhaust stream discharged from said second catalytic converter means is recycled to said first catalytic converter means.

9. The engine exhaust system of claim 1 wherein, during said second period of time, said conveying means functions such that a portion of the exhaust stream discharged from said second catalytic converter means is recycled to said first catalytic converter means.

10. The engine exhaust system of claim 7 wherein said conveying means functions such that said third period of time continues until substantially all hydrocarbons have been desorbed from said molecular sieve means.

11. The engine exhaust system of claim 1 wherein said conveying means functions such that said third period of time continues until substantially all hydrocarbons have been desorbed from said molecular sieve means.

12. The engine exhaust system of claim 7 wherein said conveying means functions such that said third period of time continues at least until the noble metal in said second catalytic converter means attains its light-off temperature.

13. The engine exhaust system of claim 12 wherein said conveying means function for a fourth period of time, subsequent to said second catalytic converter means attaining its light-off temperature, to convey substantially all of said engine exhaust stream through said first catalytic converter means, thereafter through said second catalytic converter means, and thereafter out of said system to the atmosphere.

14. A method of controlling hydrocarbon emissions from an internal combustion engine producing a hydrocarbon-containing exhaust stream comprising
providing first catalytic converter means for substantially converting hydrocarbons in said hydrocarbon-containing engine exhaust stream to water and carbon dioxide, said first catalytic converter means having a light-off temperature;
providing second catalytic converter means farther from the engine than said first means, said second means comprising (a) molecular sieve means capable of adsorbing hydrocarbons from said engine exhaust stream and further capable of having said hydrocarbons desorbed therefrom upon heating to a desorption temperature, and (b) at least one catalyst for catalyzing the conversion of hydrocarbons to water and carbon dioxide, said catalyst having a light-off temperature; and
selectively conveying said exhaust stream so as to
  (i) convey, during a first period of time prior to said first catalytic converter means attaining its light-off temperature, substantially all of said engine exhaust stream through said first catalytic converter means and then through said second catalytic converter means;
  (ii) convey, for a second period of time subsequent to said first catalytic converter means having attained its light-off temperature and prior to the molecular sieve means having attained its desorption temperature, (a) a portion of the exhaust stream discharged from said first catalytic converter means through said second catalytic converter means, and (b) the remainder of the exhaust from said first means to the atmosphere, bypassing said second means; and
  (iii) convey, for a third period of time subsequent to said molecular sieve means having attained its desorption temperature, (a) a portion of the exhaust stream from said first catalytic converter means through said second catalytic converter means and then recycle substantially all of the exhaust discharged from said second means back to either said engine or said first means, and (b) the remainder of the exhaust stream from said first means to the atmosphere, bypassing said second means.

15. The method of claim 14 wherein said molecular sieve means comprises a high-silica crystalline zeolite and said catalyst comprises at least one noble metal.

16. The method of claim 15 wherein said zeolite is selected from the group consisting of silicalite, ZSM-5, ZSM-8, ZSM-11, ZSM-12, and mordenite.

17. The method of claim 16 wherein said second catalytic converter means comprises a ceramic substrate coated with or embedded with zeolite and noble metal catalyst.

18. The method of claim 17 wherein said zeolite is selected from the group consisting of silicalite, ZSM-5, ZSM-8, ZSM-11, ZSM-12, and mordenite.

19. The method of claim 13 wherein said ceramic substrate is in the form of a honeycomb.

20. The method of claim 15 wherein said conveying means comprises at least one thermostatically-controlled valve and wherein during said third period of time, said conveying means functions to convey the exhaust from said second converter means back to said first converter means.

21. The method of claim 20 wherein, during said second period of time, said conveying means functions such that a portion of the exhaust stream discharged from said second catalytic converter means is recycled to said first catalytic converter means.

22. The method of claim 14 wherein, during said second period of time, said conveying means functions such that a portion of the exhaust stream discharged from said second catalytic converter means is recycled to said first catalytic converter means.

23. The method of claim 20 wherein said conveying means functions such that said third period of time continues until substantially all hydrocarbons have been desorbed from said molecular sieve means.

24. The method of claim 16 wherein said conveying means functions such that said third period of time continues until substantially all hydrocarbons have been desorbed from said molecular sieve means.

25. The method of claim 20 wherein said conveying means functions such that said third period of time continues at least until the noble metal in said second catalytic converter means attains its light-off temperature.

26. The method of claim 25 wherein said conveying means function for a fourth period of time, subsequent to said second catalytic converter means attaining its light-off temperature, to convey substantially all of said engine exhaust stream through said first catalytic converter means, thereafter through said second catalytic converter means, and thereafter out of said system to the atmosphere.

* * * * *

UNITED STATES PATENT AND TRADEMARK OFFICE
CERTIFICATE OF CORRECTION

PATENT NO. : 5,125,231
DATED : June 30, 1992
INVENTOR(S) : Patil et al It is certified that error appears in the above-identified patent and that said Letters Patent is hereby corrected as shown below:

Column 9, line 18, after "to" insert "become adsorbed. As the of the zoelite".

Column 16, line 46, "16" should be "15".

Column 17, line 7 "16" should be "15".

Signed and Sealed this

Ninth Day of November, 1993

Attest:

BRUCE LEHMAN

Attesting Officer   Commissioner of Patents and Trademarks